United States Patent [19]

Nelson et al.

[11] Patent Number: 4,679,485

[45] Date of Patent: Jul. 14, 1987

[54] BALLISTIC TOLERANT DUAL LOAD PATH BALLSCREW AND BALLSCREW ACTUATOR

[75] Inventors: Jeffrey D. Nelson, Rockford; John F. Scanlon, Roscoe, both of Ill.

[73] Assignee: Sundstrand Corporation, Rockford, Ill.

[21] Appl. No.: 686,983

[22] Filed: Dec. 27, 1984

[51] Int. Cl.⁴ .............................. F41H 5/04; F16H 1/18
[52] U.S. Cl. .................................. 89/36.02; 89/36.11; 74/424.8 R
[58] Field of Search ............................ 89/36.02, 36.11; 428/911; 74/424.8 R

[56] References Cited

U.S. PATENT DOCUMENTS

| | | | |
|---|---|---|---|
| 3,038,352 | 6/1962 | Murphy | 74/424.8 R |
| 3,269,199 | 8/1966 | Deehan et al. | 74/89 |
| 3,722,355 | 3/1973 | King | 89/36.02 |
| 3,974,313 | 8/1976 | James | 428/176 |
| 4,048,365 | 9/1977 | Hoover | 428/215 |
| 4,161,125 | 7/1979 | Degnan | 74/469 |
| 4,300,439 | 11/1981 | Degnan et al. | 92/146 |
| 4,449,446 | 5/1984 | Degnan et al. | 92/146 |

OTHER PUBLICATIONS

Copies of pp. 22 and 32 from a brochure of Sundstrand Corporation, entitled, "Sundstrand Advanced Technology Group" and published more than a year prior to the filing date of this application.

Primary Examiner—John F. Terapane
Assistant Examiner—Eric Jorgensen
Attorney, Agent, or Firm—Wood, Dalton, Phillips, Mason & Rowe

[57] ABSTRACT

Ballscrew actuators are well known for use as a primary flight control actuator for operating a flight control surface. The operation of the ballscrew actuator is critical to the success of an aircraft mission; however, when the actuator is subject to ballistic fire a projectile hit which is not totally destructive can still render the actuator inoperable. Increasing the potential for operability of the ballscrew actuator after a projectile hit which is not totally destructive will increase the number of successful returns from aircraft missions.

The ballistic tolerant dual load path ballscrew actuator has a selectively driven ballnut and a ballscrew drivingly connected to the ballnut. The ballscrew has an outer tubular member with an external helical ball groove providing a primary load path. An inner tubular member fits closely within and is fixed to the outer tubular member to provide a secondary load path upon cracking of the outer tubular member by a projectile passing through the outer tubular member. The inner tubular member is formed of ballistic tolerant composite material to maintain its structural integrity when contacted by a projectile which has passed through and caused cracking of the outer tubular member.

38 Claims, 6 Drawing Figures

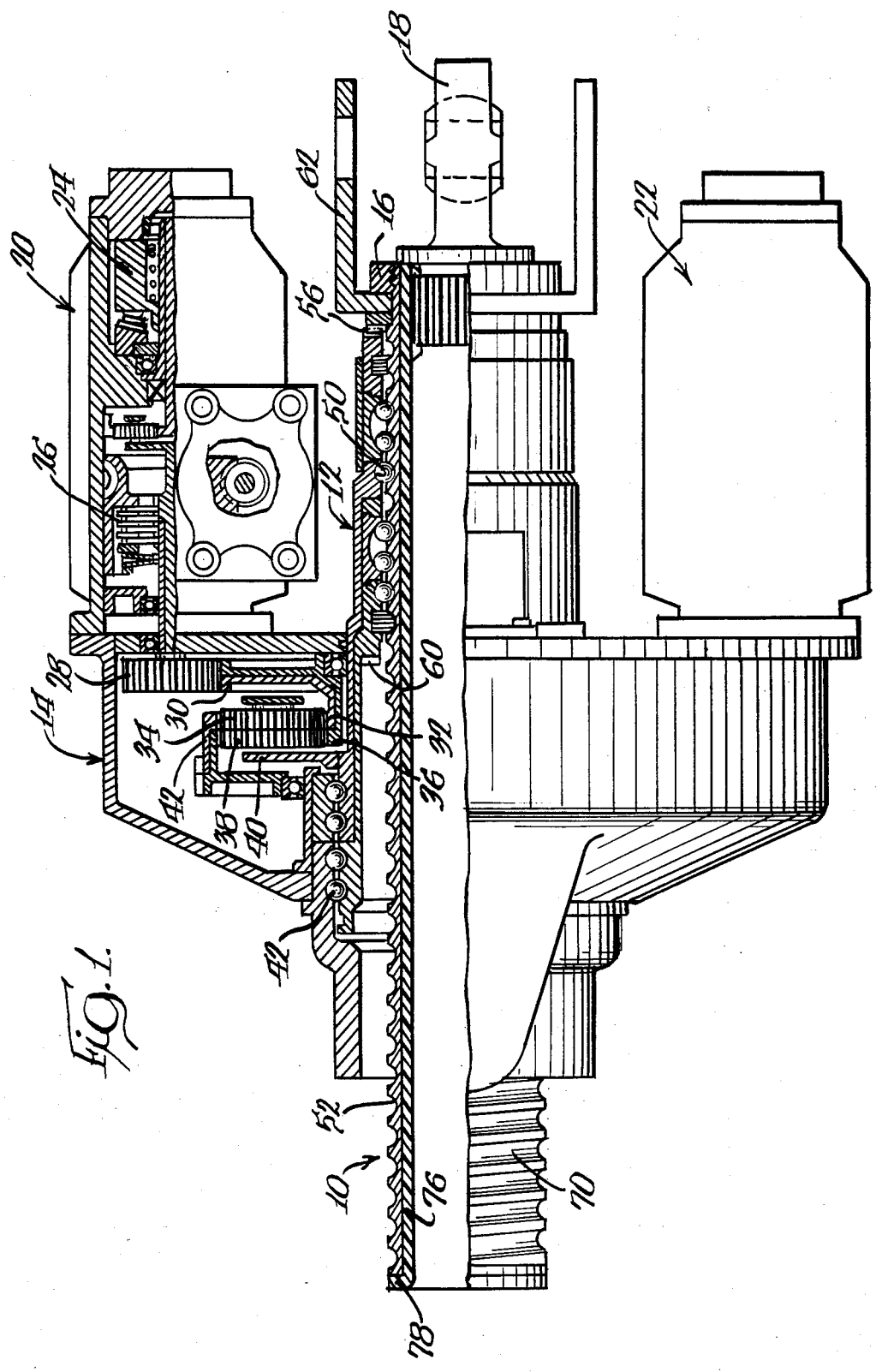

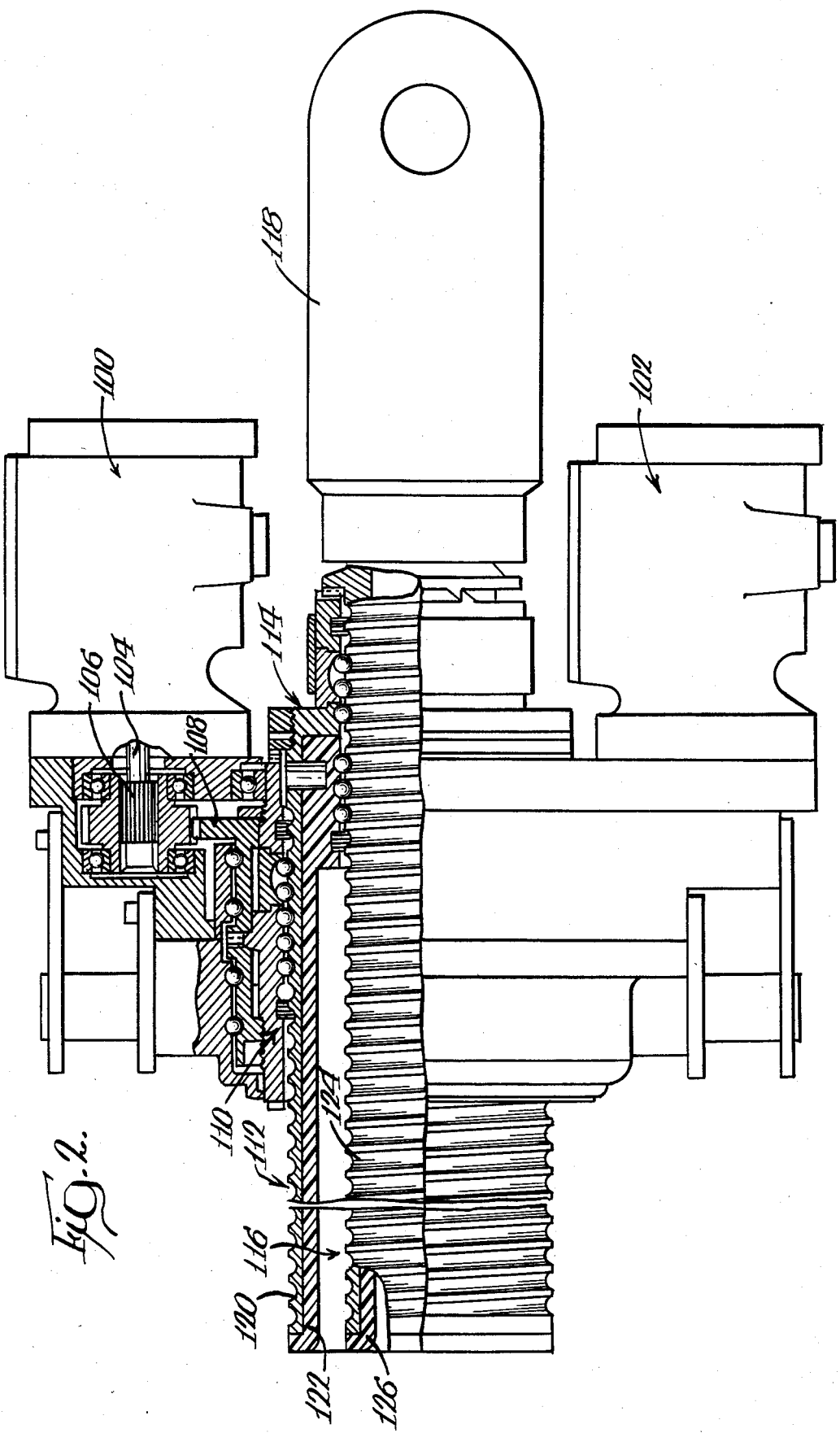

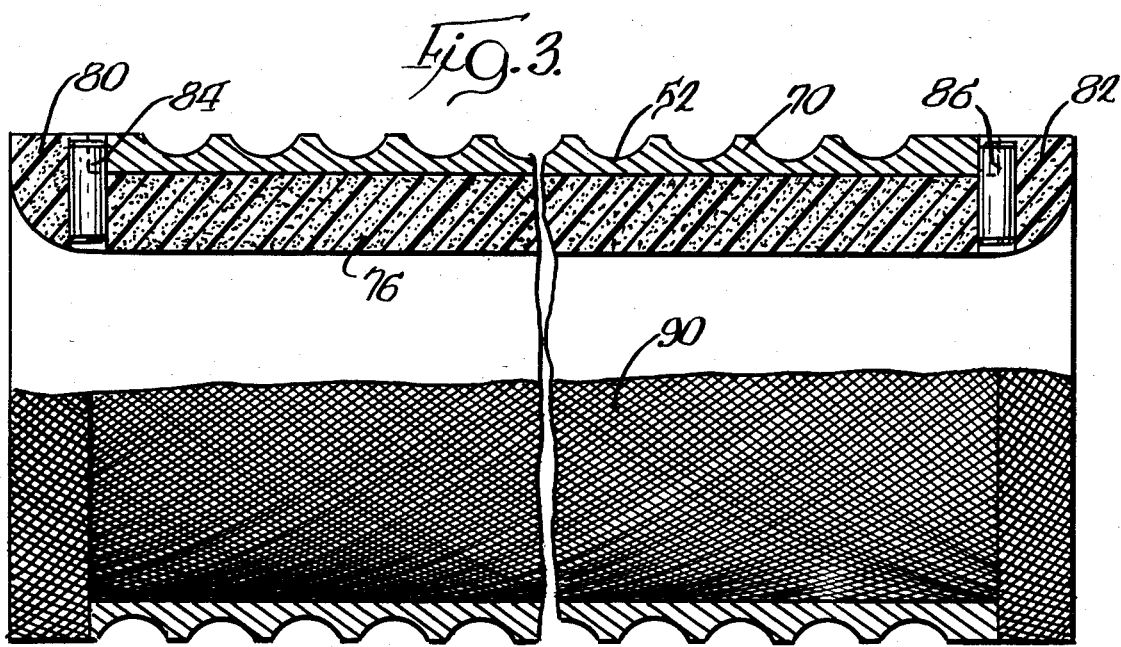
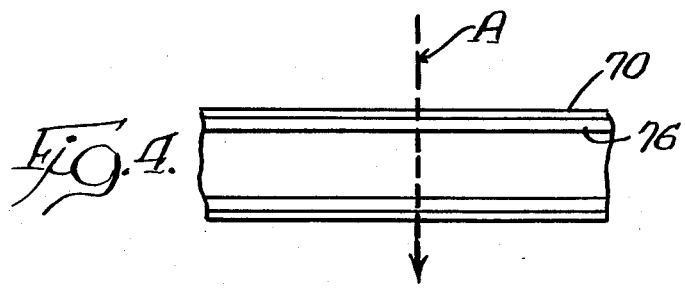
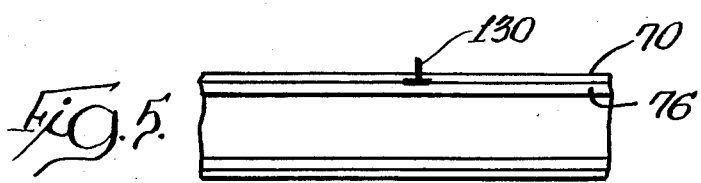
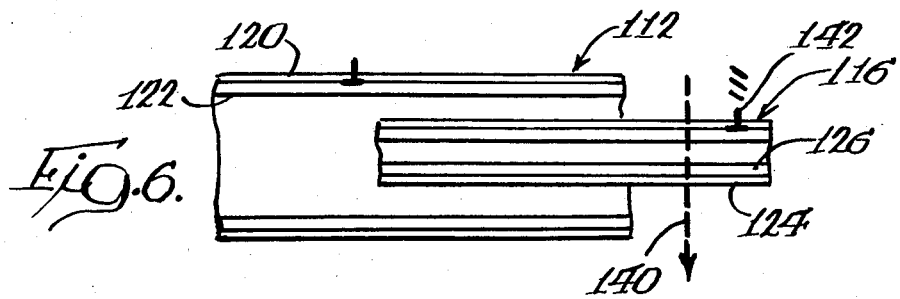

BALLISTIC TOLERANT DUAL LOAD PATH BALLSCREW AND BALLSCREW ACTUATOR

DESCRIPTION

1. Field of the Invention

This invention relates to a ballistic tolerant dual load path ballscrew and, more particularly, a ballscrew actuator having either a single ballscrew or telescoped ballscrews. Each ballscrew has an outer tubular member formed with a helical groove for coaction with a ballnut providing a primary load path and an inner tubular member operable to provide a secondary load path in the event of a failure of the outer tubular member. The inner tubular member is formed of ballistic tolerant material whereby a ballistic hit reaching the inner tubular member, after passing through and cracking the outer tubular member, will not cause the inner tubular member to lose its structural integrity and the load-carrying capability of the ballscrew is maintained.

2. Background of the Invention

There are many components of an aircraft that are positioned by operation of a ballscrew actuator. In such an actuator, there is relative rotation between a ballscrew and a ballnut to achieve linear translation of one of these elements. One of the actuator elements is fixed and the other actuator element is connected to a flight control surface or other component to be moved. Because of use of such a ballscrew actuator in controlling critical surfaces for aircraft flight, it is common to construct the ballscrew of inner and outer tubular members which are interconnected at their ends to provide a dual load path. The outer tubular member provides a primary load path for the ballscrew and the inner tubular member provides a secondary load path to maintain the integrity of the ballscrew. This structure is known as a dual load path ballscrew.

The outer tubular member has a helical ball groove which is associated with the ballnut by means of balls positioned in a portion of the helical groove. As an example, rotation of the ballnut will cause linear translation of the ballscrew for transmission of force and positioning of an actuated surface.

The dual load path ballscrew actuator is sometimes used as a primary flight control actuator in aircraft which are subject to ballistic fire. It is critical to the success of the aircraft mission that the ballscrew actuator continue to function after a ballistic hit which has damaged, but not destroyed, the ballscrew actuator. Upon the occurrence of a damaging ballistic hit, the ballscrew must maintain structural integrity and must be failsafe. The outer tubular member is commonly made of a hardened steel, and a ballistic hit on this member can cause it to crack in a way that results in failure. This result could also occur when the projectile reaches the inner tubular member of conventional metal construction.

The invention disclosed herein provides for improvement over the prior art in having the inner tubular member formed of ballistic-tolerant material which will not substantially sacrifice structural integrity when hit with a ballistic projectile. The ballistic-tolerant material serves to preserve the secondary load path established by the inner tubular member and adds to the energy absorption capability of the ballscrew.

SUMMARY OF THE INVENTION

A primary feature of the invention is to provide a ballistic-tolerant dual load path ballscrew actuator utilizing a ballscrew having an outer tubular member with a helical groove and made of a hardened material which is suitable to withstand high contact loads during operation. This requirement means that the outer tube is subject to crack growth and subsequent failure as a result of a ballistic hit. The inner member is positioned within and fixed to the outer tubular member and is formed of a ballistic tolerant composite material which will maintain its structural integrity when hit by a projectile which has passed through and possibly cracked the outer tubular member thus maintaining the load carrying capability and possible operability of the ballscrew.

The foregoing is achieved by having the inner member as a tubular member closely fitted within the outer tubular member and secured thereto and with the composite material being of a resin-bonded cross-woven fiber. The composite material is of a thickness to either permit passage of a projectile therethrough or to retain the projectile against passage therethrough with deformation of the inner tubular member and with the handling characteristic of the projectile being dependent upon the fiber and weaving characteristics thereof as well as the thickness of the composite material.

The ballscrew actuator may have either a single ballscrew, as defined in the preceding paragraph, or can have a pair of the ballscrews of different diameters and telescopically related, whereby there are inner and outer ballscrews and the inner ballscrew lies substantially within the outer ballscrew when the actuator is retracted. The characteristics of the inner and outer ballscrews can be varied respecting the response to a ballistic hit by selection of the composite material forming the inner tubular member of the inner and outer ballscrews. The inner tubular members may be constructed to permit passage of a projectile therethrough or "catching" of the projectile with deformation of the inner tubular member.

Also, there is the possibility of constructing the inner tubular member of the outer ballscrew to "catch" a projectile and the inner tubular member of the inner ballscrew being constructed of a composite material to either permit a projectile to pass therethrough when it is an "aligned" round and to catch a "tumbled" round. In this configuration, the outer ballscrew serves as protection for the inner ballscrew when the actuator is retracted. This prevents the potential of a jam due to a lodged projectile unable to penetrate the eight surfaces of the two ballscrews and allows the inner ballscrew to operate. The outer ballscrew will still have the capability to hold a load, but is unlikely to translate through the associated ballnut and, thus, cannot operate.

An object of the invention is to provide a ballistic tolerant, dual load path ballscrew actuator having a selectively driven ballnut and a ballscrew operatively connected to said ballnut, said ballscrew having an outer tubular member with an external helical ball groove providing a primary load path and an inner tubular member closely fitting within and fixed to the outer tubular member to provide a secondary load path upon cracking of the outer tubular member by a projectile passing through the outer tubular member, said inner tubular member being formed of ballistic tolerant composite material to maintain its structural integrity when contacted by said projectile which has passed through and caused cracking of the outer tubular member.

Still another object of the invention is to provide a ballistic tolerant, dual load path ballscrew actuator as defined in the preceding paragraph wherein the ballistic tolerant material is a composite of materials which can be selected to either permit a projectile to pierce and pass through the inner tubular member or to deform upon being hit by a projectile without piercing thereof by the projectile.

Another object of the invention is to provide a ballistic tolerant dual load path ballscrew actuator wherein said composite material is a cross-woven aramid fiber in a resin binder to achieve a structure which deforms, but is not pierced by a projectile.

Still another object of the invention is to provide a ballistic tolerant, dual load path ballscrew actuator wherein the composite material is resin-bonded cross-woven fiber glass.

Still another object of the invention is to provide a ballistic tolerant, dual load path ballscrew actuator as defined in the preceding paragraphs wherein the inner and outer tubular members are bonded together along the entire length of the inner tubular member to aid in energy absorption and further optionally wherein the tubular members are mechanically interconnected.

Still another object of the invention is to provide a ballscrew usable in a ballscrew actuator and having the characteristics set forth in the preceding paragraphs.

A ballscrew manufactured in accordance with the teachings of this invention can be adapted to meet many differing requirements in rendering the ballscrew actuator ballistically tolerant. The inner tubular member providing the secondary load path can be designed to meet several different requirements including the nature of the ballistic threat and, particularly, the size and energy content of the projectile to which the ballscrew actuator may be subjected as well as the required design wall thickness of the outer tubular member normally formed of steel. The inner tubular member can be constructed of a ballistic tolerant composite material to either permit a projectile to pass therethrough, act as a "catcher's mitt" to stop the projectile, or permit passage of the projectile therethrough when the projectile is an "aligned" round and catch the projectile when the projectile is a "tumbled" round. In all of these cases, the inner tubular member performs its ballistic tolerant function without sacrificing the load-carrying capability thereof and in cases of minor damage maintains the outer tubular member in coacting relation with an associated ballnut.

A composite material which will permit the projectile to pass through the inner tubular member can be a resin-bonded cross-weave fiber composite which permits a projectile to pass through it, like pushing a pencil through a screen door. Some of the fibers may be damaged, but crack propagation is minimized. An inner tubular member catching a projectile can be formed of a resin-bonded fiber composite using a fiber such as an aramid fiber having a very high strength-to-weight ratio. With a sufficient thickness, this material will not permit a projectile to pass therethrough, but will deform and act as an energy absorber. An alternate structure as immediately above described has the wall of the inner tubular member thinner and, thus, the energy of an "aligned" round will result in the projectile passing therethrough while the lesser energy in a "tumbled" round will merely cause deformation of the inner tubular member. The cross-weaving of the fibers may result in some fiber damage, but crack propagation will not occur.

Further enhancement of the operability of the ballistic tolerant ballscrew resides in a tight fit of the ballscrew and inner tube which aids in energy absorption with means to prevent axial separation of the screw. One method is by bonding of the inner and outer tubular members to each other with an adhesive and with a mechanical connection of the members as a back-up to the adhesive bonding. This assures transfer of torsional loads between members. There can also be a mechanical connection under tension without bonding to prevent axial separation. This enables the balls to roll on the threads with a circumferential crack.

DESCRIPTION OF THE DRAWINGS

FIG. 1 is a side elevational view of the ballistic tolerant dual load path ballscrew actuator with the upper half thereof shown in vertical section;

FIG. 2 is a view, similar to FIG. 1, of an alternate embodiment of the ballscrew actuator having inner and outer telescoping ballscrews;

FIG. 3 is a fragmentary view of a ballscrew as used in the ballscrew actuator and showing the composite material of the inner tubular member;

FIG. 4 is a diagrammatic view illustrating the action of a projectile with respect to one ballscrew construction;

FIG. 5 is a diagrammatic view illustrating the action of a projectile with respect to another construction of ballscrew; and FIG. 6 is a diagrammatic view of a telescoping ballscrew actuator showing different projectile actions dependent upon different structures of the ballscrews.

DESCRIPTION OF THE PREFERRED EMBODIMENTS

A first embodiment of the invention is shown in FIG. 1 wherein a ballscrew, indicated generally at 10, is associated with a ballnut, indicated generally at 12. The ballnut 12 is rotatably mounted within a housing, indicated generally at 14, and the ballscrew 10 is fixed at 16 to a connecting member 18. The housing 14 can be mounted to a fixed aircraft surface, while the connecting member 18 is connected to a member to be actuated. There may be pivotal movement between the connecting member 18 and the member to be actuated. However, the connecting member is held against rotation about the axis of the ballscrew whereby the ballscrew 10 cannot rotate, but can move linearly.

The ballscrew 12 may be caused to rotate upon operation of one or both of a pair of power drive units 20 and 22. Each of these power drive units, as shown for power drive unit 20, has an axial piston motor 24 and a releasable brake 26 for controlling a drive shaft having a gear 28 thereon which drive separate inputs to a speed-summing gearbox. Examples of usable power drive units are disclosed in the Flippo U.S. Pat. No. 4,191,094 and the Aldrich U.S. Pat. No. 4,210,066. The gear 28 meshes with a rotatable gear 30 carrying a sun gear 32 which meshes with a planetary gear 34. The other driven gear drives a sun gear 36 which meshes with a planetary gear 38. The planetary gears 34 and 38 are rotatably mounted on a planetary carrier 40 and mesh with a fixed ring gear 42 whereby driving of the planetary gears 34 and 38 causes rotation of the planetary carrier 40. The planetary carrier is rotatably mounted within the housing by ball bearings 42 and is fixed to the ballnut 12.

The ballnut 12 has ball grooves 50 receiving annular rows of balls which coact with a helical groove 52 formed on the exterior of the ballscrew 10.

With the foregoing structure, as the power drive units 20 and 22 are placed into operation, the ballnut 12 is caused to rotate and, dependent on the direction of rotation thereof, the ballscrew 10 will be caused to linearly translate in one direction or the other to transmit force through the connecting member 18. The use of the speed-summing gearbox enables continued operation of the ballscrew actuator, even if one of the power drive units 20 and 22 should become inoperable.

The ballscrew actuator is shown in FIG. 1 in a fully-retracted position wherein buttress-shaped elements 56 are in contact to prevent full facial engagement between planar surfaces to permit freedom of relative rotation between the ballnut 12 and the connector 18 when the ballscrew is moved outwardly from retracted position. There are similar buttress-shaped elements 58 and 60 which coact to prevent facial engagement when the ballscrew 10 is fully extended. A member 62 fixed to the ballscrew facilitates rotation thereof.

The ballscrew actuator is of a ballistic tolerant, dual load path structure by having the ballscrew 10 formed of inner and outer tubular members and with the inner tubular member formed of a ballistic tolerant composite material.

An outer tubular member 70 of the ballscrew 10 has the external helical groove 52 and may be formed of a hardened steel material to provide a primary load path between the ballnut 12 and the connecting member 18. When the ballscrew actuator is subject to ballistic fire, a ballistic hit can cause the outer tubular member to crack in a way that results in failure thereof. The inner tubular member 76 is associated with the outer tubular member and formed of a ballistic tolerant material which can survive being hit by a projectile passing through the outer tubular member to provide a secondary load path by maintaining the outer tubular member 70 in operative condition for coaction with the ballnut 12.

The inner tubular member 76 is associated with the outer tubular member by bonding as more particularly described hereinafter. The tubular and mechanical joint members are in close-fitting bonded relation whereby the inner tubular member contributes to the energy absorption of the outer tubular member 70.

This association of the inner and outer tubular members is more particularly shown in FIG. 3. The inner and outer tubular members are in close-fitting relation and adhesively bonded to each other. The inner tubular member has upturned ends 80 and 82 which lock the members together. To assure added reliability and transmission of torsional loads, the members are also mechanically connected together, as by pins 84 and 86 passing through aligned openings in both of the members.

Alternatively, the inner and outer tubular members can be mechanically connected together at their ends by means preloaded in tension.

The inner tubular member is formed of a ballistic tolerant composite material which comprises resin-bonded fibers 90. In at least one embodiment, the fibers are cross-woven, as seen in FIG. 3. The fiber selection and the formation thereof into a tubular member can be selected to meet the desired requirements of ballistic tolerance, as more particularly described hereinafter.

The design of the inner tubular member 76 of the ballscrew can be varied to provide for different handling of a projectile, depending on the size and nature of the ballistic threat and the wall thickness of the steel outer tubular member 70. If a projectile which has cracked and passed through the steel outer tubular member 70 is to pass through the inner tubular member 76, the composite material of the inner tubular member can be cross-woven fiber glass rovings in a resin binder of epoxy or polyester. With the cross-weaving as seen in FIG. 3, it will be seen that a projectile can pass through the glass fibers, like a pencil through a screen door. The fibers will be damaged, but crack propagation cannot occur. This action is illustrated in FIG. 4 wherein a projectile has a travel path as shown by the broken line arrow A and passes through the walls of both the outer tubular member 70 and the inner tubular member 76. With such a ballistic hit, the inner tubular member retains its structural integrity whereby, with its association with the outer tubular member, the latter member is maintained in operative condition to coact with the ballnut 12 for transmission of loads through the secondary load path established by the inner tubular member.

Another design of the inner tubular member 76 would be to have the inner tubular member act as a "catcher's mitt" wherein, as seen in FIG. 5, a projectile 130 can pass through the outer tubular member 70 of steel, but the inner tubular member 76 will catch the projectile. Although there will be some inward deformation of the inner tubular member, there will not be a failure thereof. This composite material to achieve this result can be achieved by use of a fiber in a resin binder to provide a composite having a very high strength-to-weight ratio and which acts as an energy absorber when sized to do so. An example of such composite is the use of an aramid fiber with such fiber being an aromatic polyamide fiber of extremely high tensile strength and greater resistance to elongation than steel. One commercial product of this type is marketed under the trade name KEVLAR. This material has been known for use in bullet-resistant structures. In one example of such structure, the inner tubular member has a wall thickness of 0.7" and is formed of KEVLAR 29 which is wound on a mandrel in layers, with one layer being 0.010" and, therefore, the material being laid up in 70 layers and, after winding, is heat-cured to form the rigid composite material.

FIG. 2 shows an alternate embodiment of ballscrew actuator having telescoping ballscrews driven by a torque-summing gearbox.

A pair of power drive units 100 and 102 each have an output shaft driving a gear with the power drive unit 100 shown as having output shaft 104 driving a gear 106. The two output gears mesh with a common gear 108 in a torque-summing gearbox which is associated with a first ballnut 110 associated with a first ballscrew, indicated generally at 112. A second ballnut, indicated generally at 114, is connected for rotation with the first ballscrew 112 and coacts with a second inner ballscrew, indicated generally at 116. The second inner ballscrew 116 is rotatably associated with a connecting member 118 which can be pivotally connected to a member to be actuated and which is held against rotation axially of the ballscrew by its pivotal connection. The construction of this ballscrew actuator is more particularly shown and described in the copending application of Duane Grimm et al entitled Jam Tolerant Redundant Drive Ballscrew Actuator, Ser. No. 868,984, filed Dec. 27, 1984, and reference may be made thereto for more details regarding this structure.

As seen in FIG. 2, the first ballscrew 112 has an outer tubular member 120 and an inner tubular member 122 constructed as described in connection with FIGS. 1 and 3. The inner ballscrew 116 has an outer tubular member 124 and an inner tubular member 126, with the second ballscrew 116 also being constructed as described in connection with FIGS. 1 and 3. In the operation of the structure of FIG. 2, rotation of the ballnut 110 will cause action of the first ballscrew 112 as well as the second ballnut 114 to cause extension of the ballscrews in any sequence, dependent upon the resistance encountered between the ballnuts and the ballscrews.

FIG. 6 diagrammatically illustrates a telescoping ballscrew of the type shown in FIG. 2 and illustrates different reactions to a projectile hit. The inner ballscrew 116 has an outer tubular member 124 and an inner tubular member 126, with the latter member being constructed of a material as described in connection with FIG. 5, but with a thinner wall to have a lesser total energy absorption. Thus, an "aligned" round, indicated by the arrow 140, which passes through the outer tubular member 124 may pass entirely through the inner ballscrew 116 while a "tumbled" round, indicated at 142 having lesser energy will be caught by the inner tubular member 126 acting as the "catcher's mitt" previously referred to. This structure can either be the inner ballscrew of a telescoping ballscrew actuator as illustrated in FIG. 6, or can be the structure of a ballscrew utilizing a single ballscrew as in the embodiment of FIG. 1.

FIG. 6 additionally illustrates a case different from those described in connection with FIGS. 4 and 5 as well as previously described in connection with the inner tubular member of FIG. 6. The outer ballscrew 112 has the inner tubular member 122 thereof formed similarly to the structure of FIG. 5 to function as a "catcher's mitt" and the inner ballscrew 116 can function as previously described. In this configuration, the outer ballscrew 112 serves as protection for the inner ballscrew when the actuator is retracted. This prevents the potential of a jam due to a lodged projectile unable to penetrate through the eight wall thicknesses of the telescoping ballscrew and allows the inner ballscrew 124 to operate. The outer ballscrew 112 can still hold loads but is unlikely to translate through the ballnut 114 when it is damaged.

The dual load path ballscrew actuator with the use of ballistic tolerant material provides increased reliability in aircraft subject to ballistic fire by increasing the probability of continued operation of primary flight control components and thus sucessful return from the mission. Although it is known to have redundant load paths in a ballscrew, there has been no assurance of failsafe operation upon the occurrence of a ballistic hit which will crack the steel outer member of the ballscrew and comes into contact with the inner tubular member of conventional construction providing the secondary load path. The use of ballistic tolerant materials for the inner tubular member results in continued structural integrity of the inner tubular member to provide a secondary load path and provide for continued coaction of the ballscrew with the ballnut for linear translation of the ballscrew.

We claim:

1. A ballistic tolerant dual load path ballscrew actuator comprising, a selectively driven ballnut and a ballscrew drivingly connected to said ballnut, said ballscrew having an outer tubular member of a hardened metal material to withstand high contact loads and having an external helical ball groove providing a primary load path and an inner tubular member closely fitting within and fixed to the outer tubular member to provide a secondary load path upon cracking of the outer tubular member by a projectile passing through the outer tubular member, said inner tubular member being formed of a rigid ballistic tolerant composite nonmetallic material to maintain its structural integrity when contacted by said projectile which has passed through and caused cracking of the outer tubular member and which, by being fixed to the outer tubular member, maintains the overall length of the outer tubular member and prevents propagation of said crack.

2. A ballistic tolerant dual load path ballscrew as defined in claim 1 wherein said ballistic tolerant material is a composite of materials which permits a projectile to pierce the inner tubular member.

3. A ballistic tolerant dual load path ballscrew as defined in claim 2 wherein the projectile can pass through the ballscrew.

4. A ballistic tolerant dual load path ballscrew as defined in claim 1 wherein said ballistic tolerant material is a composite of materials which deforms upon being hit by a projectile but which is not pierced by the projectile.

5. A ballistic tolerant dual load path ballscrew as defined in claim 4 wherein said composite of materials is a cross-woven aramid fiber in a resin binder.

6. A ballistic tolerant dual load path ballscrew as defined in claim 1 wherein said outer tubular member and inner tubular member are in closely fitting relation and are secured together by bonding.

7. A ballistic tolerant dual load path ballscrew as defined in claim 6 wherein said outer tubular member and inner tubular member are bonded together along the entire length of the inner tubular member to prevent ballscrew separation after a circumferential crack occurs.

8. A ballistic tolerant dual load path ballscrew as defined in claim 7 wherein said outer tubular member and inner tubular member are additionally mechanically interconnected.

9. A ballistic tolerant dual load path ballscrew as defined in claim 1 wherein said ballscrew is the outer ballscrew of a pair of telescoping ballscrews.

10. A ballistic tolerant dual load path ballscrew as defined in claim 1 wherein said ballscrew is the inner ballscrew of a pair of telescoping ballscrews.

11. A ballistic tolerant dual load path ballscrew actuator as defined in claim 1 wherein said actuator has a pair of said ballscrews telescoped one within the other when the actuator is retracted.

12. A ballistic tolerant dual load path ballscrew as defined in claim 11 wherein each of said ballscrews have the inner tubular member formed of said ballistic tolerant material and said material is a composite of materials which permits a projectile to pierce the inner tubular member.

13. A ballistic tolerant dual load path ballscrew as defined in claim 12 wherein the projectile can pass through the inner tubular members.

14. A ballistic tolerant dual load path ballscrew as defined in claim 11 wherein said ballistic tolerant material is a composite of materials which deforms upon being hit by a projectile but which is not pierced by the projectile.

15. A ballistic tolerant dual load path ballscrew as defined in claim 14 wherein said composite of materials is a cross-woven aramid fiber in a resin binder.

16. A ballistic tolerant dual load path ballscrew as defined in claim 11 wherein said outer tubular member and inner tubular member of each ballscrew are in closely fitting relation and are secured together by bonding.

17. A ballistic tolerant dual load path ballscrew as defined in claim 16 wherein said outer tubular members and inner tubular members are bonded together along the entire length of the inner tubular members to prevent ballscrew separation after a circumferential crack occurs.

18. A ballistic tolerant dual load path ballscrew as defined in claim 17 wherein said outer tubular members and inner tubular members are additionally mechanically interconnected.

19. A ballistic tolerant dual load path ballscrew as defined in claim 11 wherein the outer ballscrew has the inner tubular member thereof formed of a composite which will deform when hit by a projectile and the inner ballscrew has an inner tubular member which will permit an aligned projectile to pass therethrough and which will deform when hit by a tumbled round.

20. A ballistic tolerant dual load path ballscrew actuator having a ballscrew with an outer tubular member of metal subject to cracking when hit by a projectile and having an external helical groove for coaction with a ballnut and a second tubular member positioned within and having a length generally coextensive with said outer tubular member, said members being secured to each other adjacent their ends whereby the second member may react to loads applied to the ballscrew in the event the outer tubular member fails, the improvement wherein said second tubular member is formed of a rigid ballistic tolerant nonmetallic material which maintains its structural integrity without cracking thereof when hit by a projectile whereby the second tubular member will provide a secondary load path after the outer tubular member has cracked and prevent lengthwise elongation of the outer tubular member and avoid increase in the size of the crack in the outer tubular member which could cause the ballnut to malfunction.

21. A ballistic tolerant dual load path ballscrew as defined in claim 20 wherein said ballistic tolerant material is a composite of materials which permits a projectile to pierce the second tubular member.

22. A ballistic tolerant dual load path ballscrew as defined in claim 21 wherein the projectile can pass through the ballscrew.

23. A ballistic tolerant dual load path ballscrew as defined in claim 20 wherein said ballistic tolerant material is a composite of materials which deform upon being hit by a projectile but which is not pierced by the projectile.

24. A ballistic tolerant dual load path ballscrew as defined in claim 23 wherein said composite of materials is a cross-woven aramid fiber in a resin binder.

25. A ballistic tolerant dual load path ballscrew as defined in claim 20 wherein said outer tubular member and second tubular member are in closely fitting relation and are secured together by bonding.

26. A ballistic tolerant dual load path ballscrew as defined in claim 25 wherein said outer tubular member and second tubular member are bonded together along the entire length of the second tubular member to prevent ballscrew separation after a circumferential crack occurs.

27. A ballistic tolerant dual load path ballscrew as defined in claim 26 wherein said outer tubular member and second tubular member are additionally mechanically interconnected.

28. A ballistic tolerant dual load path ballscrew as defined in claim 20 wherein said ballscrew is the outer ballscrew of a pair of telescoping ballscrews.

29. A ballistic tolerant dual load path ballscrew as defined in claim 20 wherein said ballscrew is the inner ballscrew of a pair of telescoping ballscrews.

30. A ballistic tolerant dual load path ballscrew actuator comprising, a housing, a power drive unit mounted on said housing, a ballnut having a plurality of balls rotatably mounted on said housing and a dual load path ballscrew associated with said ballnut, said ballscrew having an outer tubular member of metal with an external helical ball groove receiving said plurality of balls providing a primary load path and an inner tubular member positioned within the outer tubular member to provide a secondary load path and with the ends of said members secured to each other, and said inner tubular member being formed of a composite of nonmetallic materials which will have an improved capability of maintaining structural integrity when subject to a ballistic hit passing through and cracking said outer tubular member whereby the actuator may continue to function by enabling the balls to continue to roll over the cracked outer tubular member.

31. A ballistic tolerant ballscrew actuator as defined in claim 30 wherein said material is an aramid fiber composite.

32. A ballistic tolerant ballscrew actuator as defined in claim 30 wherein said material is a composite of cross-woven fibers in a resin binder.

33. A ballistic tolerant ballscrew actuator as defined in claim 30 wherein said inner tubular member is bonded to said outer tubular member.

34. A ballistic tolerant ballscrew actuator as defined in claim 33 wherein said inner tubular member is also mechanically connected to said outer tubular member.

35. A ballistic tolerant ballscrew actuator having a dual load path ballscrew, said ballscrew having a tubular steel screw shaft subject to cracking and failure as a result of a ballistic hit, and an inner member positioned within and fixed to said tubular steel screw shaft which is formed of a cross-woven fiber and resin composite to have structural integrity after a ballistic hit and maintain the continued operability of the tubular steel screw shaft.

36. A ballistic tolerant ballscrew as defined in claim 35 wherein said inner member is bonded and mechanically fixed to said tubular steel screw shaft.

37. A ballistic tolerant ballscrew as defined in claim 35 wherein said fiber is fiber glass.

38. A ballistic tolerant ballscrew as defined in claim 35 wherein said fiber is of a type having a very high strength-to-weight ratio.

* * * * *